(12) United States Patent
Yamamoto (10) Patent No.: US 8,720,625 B2
(45) Date of Patent: May 13, 2014

(54) COOLING SYSTEM FOR ELECTRIC APPARATUS

(75) Inventor: Akira Yamamoto, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 104 days.

(21) Appl. No.: 13/504,667

(22) PCT Filed: Oct. 28, 2010

(86) PCT No.: PCT/IB2010/002755
§ 371 (c)(1),
(2), (4) Date: Apr. 27, 2012

(87) PCT Pub. No.: WO2011/051790
PCT Pub. Date: May 5, 2011

(65) Prior Publication Data
US 2012/0216999 A1   Aug. 30, 2012

(30) Foreign Application Priority Data

Oct. 29, 2009   (JP) .................................. 2009-249223

(51) Int. Cl.
*B60R 16/04*   (2006.01)

(52) U.S. Cl.
USPC ........................................ 180/68.1; 180/68.5

(58) Field of Classification Search
USPC ................... 180/68.1, 68.2, 68.3, 68.5, 65.1; 165/41; 62/239, 244, 259.2
See application file for complete search history.

(56) References Cited

U.S. PATENT DOCUMENTS

| 5,624,003 | A  | * | 4/1997  | Matsuki et al. | 180/65.1 |
|-----------|----|---|---------|----------------|----------|
| 5,937,664 | A  | * | 8/1999  | Matsuno et al. | 62/259.2 |
| 6,457,542 | B1 | * | 10/2002 | Hosono et al.  | 180/68.1 |
| 7,654,351 | B2 | * | 2/2010  | Koike et al.   | 180/68.5 |
| 7,688,582 | B2 | * | 3/2010  | Fukazu et al.  | 361/690  |
| 7,900,727 | B2 | * | 3/2011  | Shinmura       | 180/68.1 |
| 7,905,307 | B2 | * | 3/2011  | Kubota et al.  | 180/68.1 |
| 7,997,966 | B2 | * | 8/2011  | Yoda           | 454/339  |

(Continued)

FOREIGN PATENT DOCUMENTS

| CN | 1840386 A | 10/2006 |
|----|-----------|---------|
| CN | 1874051 A | 12/2006 |

(Continued)

OTHER PUBLICATIONS

International Search Report and Written Opinion for corresponding International Patent Application No. PCT/IB2010/002755 mailed Mar. 23, 2011.

(Continued)

*Primary Examiner* — Katy M Ebner
*Assistant Examiner* — Emma K Frick
(74) *Attorney, Agent, or Firm* — Sughrue Mion, PLLC (57) ABSTRACT

A vehicle includes a cooling system for electric apparatus that includes a lower cell, an upper cell that is disposed above the lower cell, and a converter that is disposed above the lower cell and that converts a voltage of electric power input to or output from the lower cell and the upper cell, in which the lower cell, the upper cell, and the converter are cooled by refrigerant, and the refrigerant inlets of the converter are disposed in the vicinity of a refrigerant outlet of at least one of the upper cell and the lower cell.

7 Claims, 9 Drawing Sheets (56) References Cited

U.S. PATENT DOCUMENTS

| | | | |
|---|---|---|---|
| 8,016,063 B2 * | 9/2011 | Tsuchiya | 180/68.5 |
| 8,187,736 B2 * | 5/2012 | Park et al. | 429/62 |
| 8,372,530 B2 * | 2/2013 | Kubota et al. | 429/100 |
| 8,556,017 B2 * | 10/2013 | Kubota et al. | 180/68.5 |
| 8,584,779 B2 * | 11/2013 | Tsuchiya et al. | 180/68.5 |
| 2008/0196957 A1 | 8/2008 | Koike et al. | |
| 2008/0251246 A1 | 10/2008 | Ohkuma et al. | |
| 2011/0162901 A1 * | 7/2011 | Lucas et al. | 180/68.2 |

FOREIGN PATENT DOCUMENTS

| | | | |
|---|---|---|---|
| EP | 1 479 567 A1 | 11/2004 |
| EP | 1 864 845 A1 | 12/2007 |
| EP | 1 935 699 A1 | 6/2008 |
| JP | 2001-328439 A | 11/2001 |
| JP | 2003-285648 A | 10/2003 |
| JP | 2004-268779 A | 9/2004 |
| JP | 2005-306230 A | 11/2005 |
| JP | 2007-223363 A | 9/2007 |
| JP | 2007-223523 A | 9/2007 |
| JP | 2008-062780 A | 3/2008 |
| JP | 2008-062781 A | 3/2008 |
| JP | 2008-081041 A | 4/2008 |
| JP | 2009-146881 A | 7/2009 |
| WO | 2009/081764 A1 | 7/2009 |

OTHER PUBLICATIONS

Japanese Office Action for corresponding JP Patent Application No. 2009-249223 issued Aug. 10, 2011.

* cited by examiner

COOLING SYSTEM FOR ELECTRIC APPARATUS

BACKGROUND OF THE INVENTION

1. Field of the Invention

The present invention relates to a cooling system for electric apparatus, and more specifically to a cooling system for electric apparatus mounted in a vehicle.

2. Description of the Related Art

Japanese Patent Application Publication No. 2008-62781 (JP-A-2008-62781) and Japanese Patent Application Publication No. 2008-62780 (JP-A-2008-62780), for example, describe the cooling structure for electric apparatus.

JP-A-2008-62781 describes a cooling structure for electric apparatus in the vehicle, in which a power supply unit arranged under a floor in the back of a seat is constituted with a battery module and a DCDC converter and a motor driving inverter that are disposed above the battery module. In this cooling structure, the air flowing from the vehicle front to the vehicle rear is spread vertically and cools the battery module, the DCDC converter, and the motor driving inverter at the same time. According to this cooling structure for electric apparatus, an overall size of the power supply unit can be reduced; cooling effect on the battery module, the DCDC converter, and the motor driving inverter can be enhanced by blowing the low temperature air before heat exchange on all of these devices; and a cooling fan, disposed in a downstream side of a merging section of the air, can be made compact and inexpensive because of the capability to reduce a pressure loss of the air.

JP-A-2008-62780 describes a cooling structure for electric apparatus in a vehicle, in which a power supply unit arranged under a floor in the back of a seat is constituted with a battery module arranged on the lower side and a DCDC converter and a motor driving inverter arranged on the upper side of the battery module in the vehicle width direction. In this cooling structure, the air flowing from the vehicle front to the vehicle rear is spread vertically and cools the battery module, the DCDC converter, and motor driving inverter in at the same time. According to this cooling structure for electric apparatus, an overall size of the power supply unit can be reduced by simplifying a cooling air passage, mountability to the vehicle can accordingly be enhanced, and also the cooling effect on the battery module, the DCDC converter, and the motor driving inverter can be enhanced by blowing the low temperature cooling air before heat exchange on all of these devices.

A disadvantage of the above-mentioned cooling structure for electric apparatus is that the heated air after cooling the converter may be used again for cooling the converter and, as a result the DCDC converter cannot be cooled efficiently.

SUMMARY OF THE INVENTION

The present invention provides a cooling system for electric apparatus that cools a converter efficiently.

An aspect of the present invention relates to the cooling system for electric apparatus mounted in the vehicle. The cooling system for electric apparatus includes a lower cell, an upper cell that is disposed above the lower cell, and a converter that is disposed above the lower cell and that converts a voltage of electric power input to or output from the lower cell and the upper cell, in which the lower cell, the upper cell, and the converter are cooled by a refrigerant, and refrigerant inlets of the converter are disposed in the vicinity of a refrigerant outlet of at least one of the upper cell and the lower cell.

In the cooling system for electric apparatus with above-mentioned structure, the refrigerant that has cooled the cell is discharged from the refrigerant outlet, and the discharged refrigerant is taken from the refrigerant inlet to cool the converter. Therefore, the converter can be cooled efficiently.

In the above-mentioned structure, the cooling system for electric apparatus may further include the refrigerant passage that is disposed between the converter and the upper cell. In this case, the cell and the converter can be cooled uniformly.

In the above structure, an exhaust air duct of the converter may be arranged around at least one of the lower cell and the upper cell. In this case, exhaust air from the converter can be prevented from entering into the cell, and also the cell can be protected from impact (collision).

In the above structure, the cooling system for electric apparatus may includes a chassis on which the lower cell and the upper cell are mounted, a blower that is disposed on the lower cell in order to cool the converter, and a tunnel that is disposed in the chassis to extend in the vehicle fore-and-aft direction, in which the converter may be disposed on the near side to the tunnel, and the blower may be disposed on the further side from the tunnel. In this case, the distance between the converter and the tunnel is shortened, and thus the length of a wire used for sending power from the converter through the tunnel to the other parts can be reduced. Therefore, electric power loss can be minimized and fuel consumption of the vehicle can be improved.

In the above structure, the chassis may have a pair of suspension towers that support a suspension, and the upper cell and the lower cell may be arranged between the suspension towers. In this case, a narrow space between the suspension towers can be utilized effectively. Also, since the upper cell and the lower cell that are heavy in weight are mounted on an axle between the suspension towers, kinematic performance of the vehicle can be prevented from worsening.

In the above structure, the suspension tower may have a side surface that is tilted with respect to the vertical direction, and the side surface may be tilted so that a distance between the side surface and the refrigerant outlet of the lower cell is smaller than a distance between the side surface and the refrigerant inlets of the converter. In this case, the refrigerant passage is widened as it extends near the top, so the heated refrigerant moves upward easily.

According to the present invention, the converter can be cooled efficiently.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A first to fourth embodiments of the present invention will be described herein after with reference to the drawings. In the following embodiments, the same or equivalent parts are denoted by the same reference numerals, and the description is not repeated. Also, the embodiments shown below may be used in combination.

Figure 1:
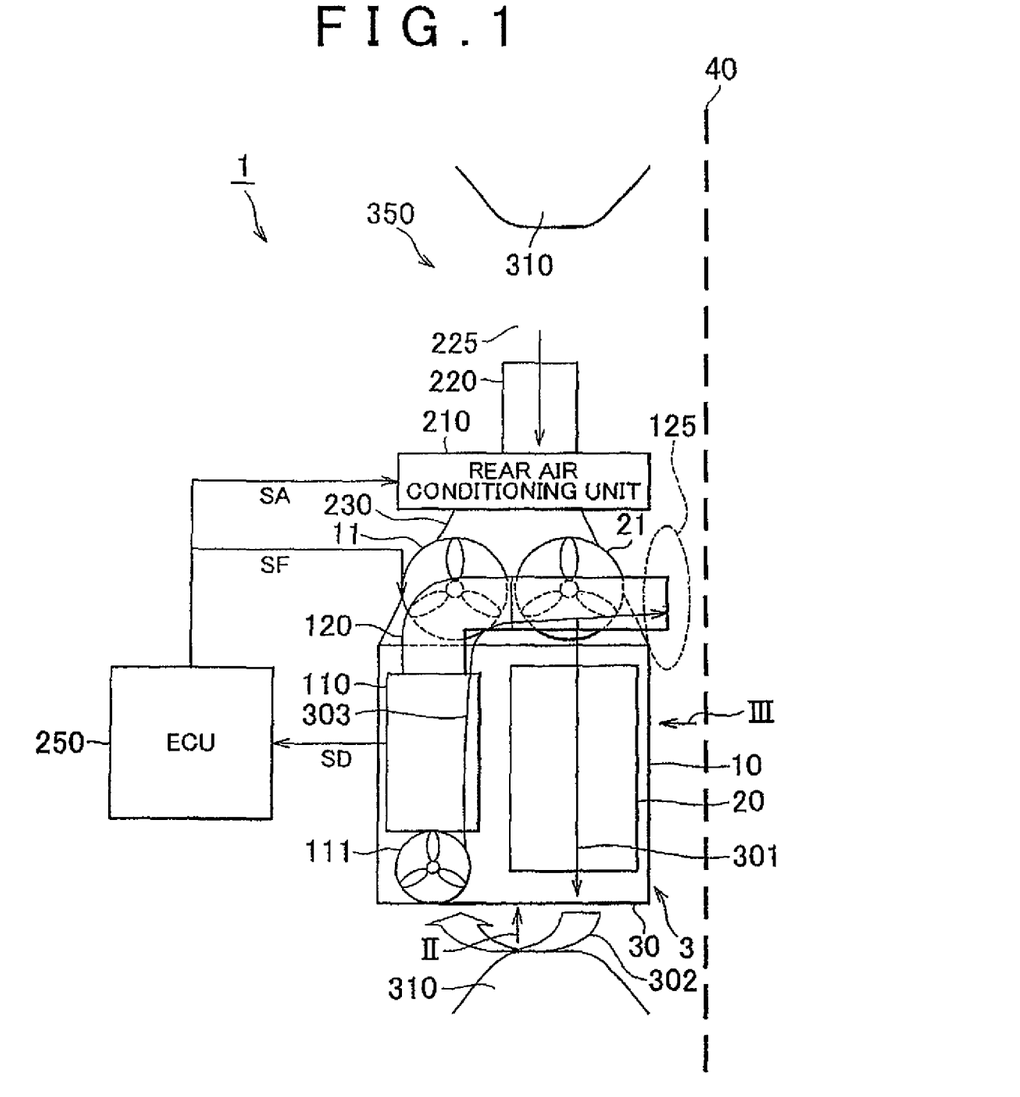
FIG. 1 is a plan view of a cooling system for electric apparatus mounted in a vehicle in accordance with a first embodiment of the present invention.
Figure 2:
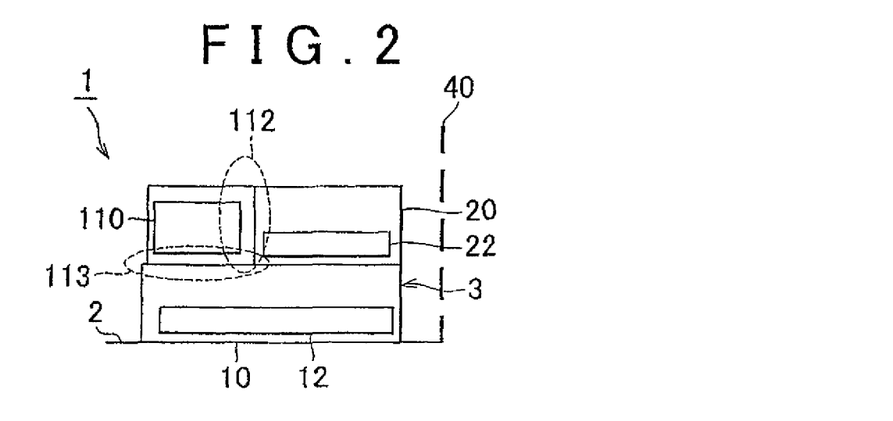
FIG. 2 is a side view of the cooling system for electric apparatus mounted in the vehicle viewed along an arrow II in FIG. 1.
Figure 3:
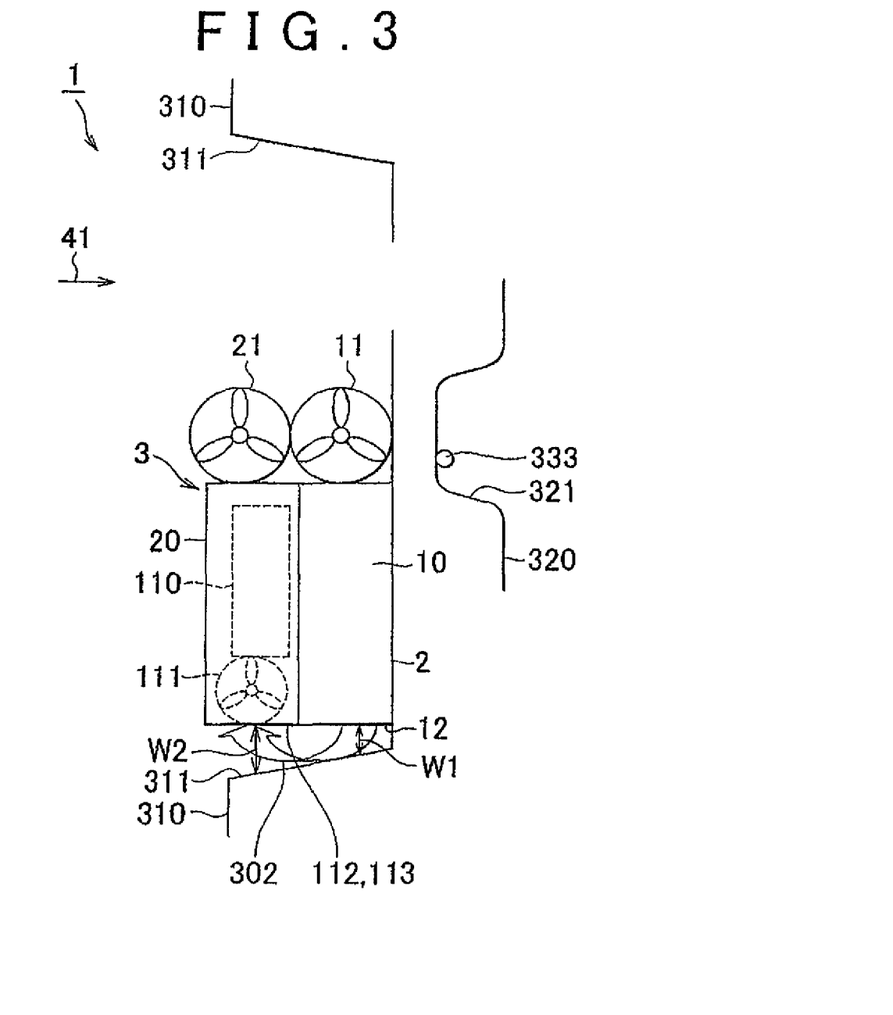
FIG. 3 is a rear view of the cooling system for electric apparatus mounted in the vehicle viewed along an arrow III in FIG. 1.

FIG. 1 is a plan view of a cooling system for electric apparatus mounted in a vehicle in accordance with a first embodiment of the present invention. FIG. 2 is a side view of the cooling system for electric apparatus mounted in the vehicle viewed along an arrow II in FIG. 1. FIG. 3 is a rear view of the cooling system for electric apparatus mounted in the vehicle viewed along an arrow III in FIG. 1. Referring to FIG. 1, a cooling system 1 for electric apparatus has an upper cell 20 and a DCDC converter 110 that is disposed adjacent to the upper cell 20. The DCDC (Direct Current to Direct Current) converter 110 and the upper cell 20 are arranged between suspension towers 310 of the vehicle. That is, the upper cell 20 is arranged on a straight line that connects between a pair of suspension towers 310. The DCDC converter 110 and the upper cell 20 are housed in a case 3. A fan 21 that cools the upper cell 20 is disposed adjacent to the upper cell 20. A fan 11 is also disposed in order to cool the lower cell. A fan 111 that cools the DCDC converter 110 is reinconnected to the DCDC converter.

An outlet of an air flow passage 220 connected to a package tray 225 forms a rear air conditioning unit 210, from which the air as a refrigerant is sent through a duct 230 to the fans 11 and 21.

Heated air after cooling the DCDC converter 110 is discharged through an exhaust air duct 120. Exhaust air from the DCDC converter 110 is drawn to an exhaust area 125.

A signal SD that indicates a temperature of the DCDC converter 110 is sent to an electric control unit (ECU) 250. The ECU 250 is able to provide a signal SA to the rear air conditioning unit 210. The ECU 250 is also able to transmit a signal SF to the fans 11 and 21.

With reference to FIG. 2, the case 3 is disposed on a floor panel 2. The case 3 is fixed to the floor panel 2. The case 3 houses the lower cell 10 and the upper cell 20. The refrigerant inlets 112 and 113 for the DCDC converter 110 are disposed in the vicinity of a refrigerant outlet 12 of the lower cell 10 and a refrigerant outlet 22 of the upper cell 20. Although the refrigerant outlets 12 and 22 are in the shape of a horizontally long rectangle in FIG. 2, the refrigerant outlets 12 and 22 are not limited to this shape but may be present in various shapes.

The refrigerant outlets 12 and 22 and the refrigerant inlets 112 and 113 may directly be connected with a duct.

With reference to FIG. 3, the pair of suspension towers 310 are disposed on both sides of the floor panel 2. The suspension tower 310 is part of the floor panel 2 and a chassis 320 that supports a suspension, and protrudes above the floor panel 2. The suspension tower 310 is a supporting part of the suspension, and the pair of suspension towers 310 may be connected to each other with a tower bar.

A side surface 311 of the suspension tower 310 is tilted with respect to the vertical direction indicated by an arrow 41, and the distance between the suspension towers 310 increases as it extends further upward from the floor panel 2. The lower cell 10 and the upper cell 20 are stacked on the floor panel 2. The DCDC converter 110 is arranged at the same height as the upper cell 20. The lower cell 10 is cooled by the fan 11 arranged at the same height as the lower cell 10. The upper cell 20 is cooled by the fan 21 arranged at the same height as the upper cell 20. The DCDC converter 110 is cooled by the air from the fan 111 arranged at the same height as the DCDC Converter 110.

The distance between the case 3 and the side surface 311 increases as it extends further from the floor panel 2 or as it extends upwards. Specifically, a distance W1 between the refrigerant outlet 12 of the lower cell 10 and the side surface 311 is smaller than a distance W2 between, the refrigerant inlets 112 and 113 of the DCDC converter 110 and the side surface 311. A tunnel 321 is formed in the chassis 320 below the floor panel 2, and the DCDC converter 110 is disposed on the near side to the tunnel 321, and the fan 111 is disposed on the further side from tunnel 321. The lower cell 10, the upper cell 20, and the DCDC converter 110 are offset on either right or left side of the tunnel 321.

Wiring 333 is disposed in the tunnel 321 to connect the DCDC converter 110 and an inverter in an engine compartment. By disposing the DCDC converter 110 on the near side to the tunnel 321, the length of a wire between the wiring 333 and the DCDC converter 110 can be reduced, and a loss of electric power transmission between the tunnel 321 and the DCDC converter 110 can be reduced.

The upper cell 20, the lower cell 10, and the DCDC converter 110 are arranged in a space 350 surrounded by a luggage trim 40, or in a space 350 between the vehicle interior and the luggage space. In order to maximize the luggage space, the upper cell 20 and the lower cell 10, as a cell pack, are constructed in two layers. The DCDC converter 110 is disposed at the same height as the upper cell 20, and the DCDC converter 110 is cooled by using the exhaust air from the cell. The refrigerant inlets 112 and 113 of the DCDC converter 110 is disposed in the vicinity of the refrigerant outlets 21 and 22, so that a low temperature intake air is stably obtained. Accordingly, the fan 111 and a heat sink of the DCDC converter 110 can be reduced in size.

The exhaust air from the cell toward the suspension tower 310 is guided by the side surface 311 of the suspension tower 310, as shown by an arrow 302, and then introduced to the refrigerant inlets 112 and 113. Accordingly, the exhaust air from the cell can stably supplied to the refrigerant inlets 112 and 113.

Figure 4:
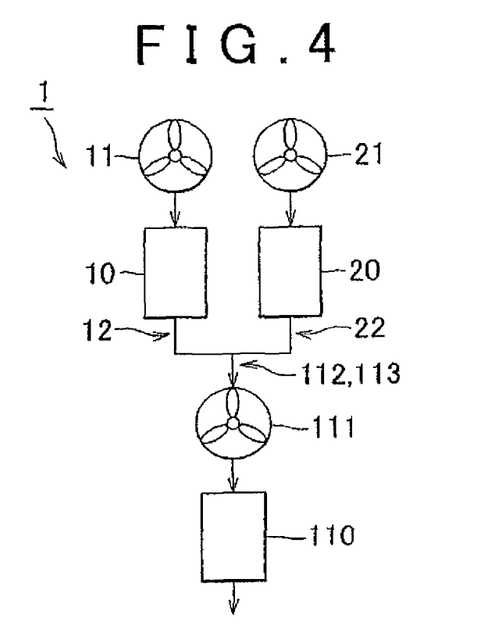
FIG. 4 illustrates the flow of a refrigerant in the cooling system for electric apparatus shown in FIG. 1 to FIG. 3.

FIG. 4 illustrates the flow of a refrigerant in the cooling system for electric apparatus shown in FIG. 1 to FIG. 3. With reference to FIG. 4, the refrigerant is sent, by the fans 11 and 12, to the lower cell 10 and the upper cell 20. The refrigerants are discharged, from the refrigerant outlet 12 for the lower cell 10 and from the refrigerant outlet 22 for the upper cell 20, and collected, and then sent from the refrigerant inlets 112 and 113 for the DCDC converter 110 to the fan 111. The refrigerant is supplied to the DCDC converter 110 by the fan 111, and the DCDC converter is thus cooled.

Figure 5:
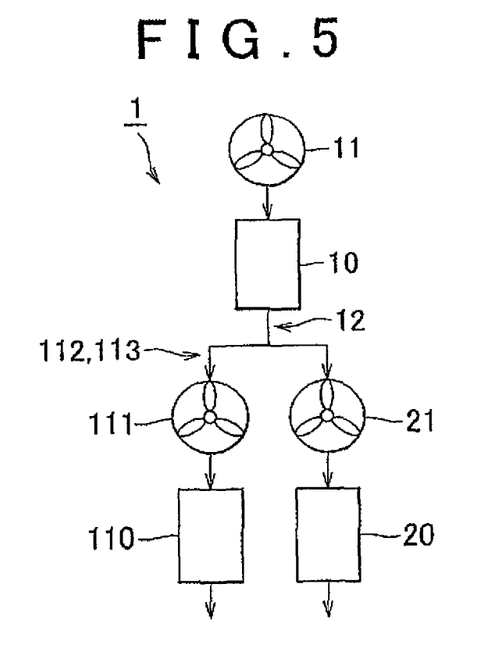
FIG. 5 illustrates the flow of the refrigerant in the cooling system for electric apparatus of a first modification of the first embodiment.

FIG. 5 illustrates the flow of the refrigerant in the cooling system for electric apparatus in accordance with a first modification of the first embodiment. With reference to FIG. 5, in the cooling system 1, the refrigerant is supplied to the lower cell 10 by the fan 11 for the lower cell. The refrigerant discharged from the refrigerant outlet 12 for the lower cell 10 is divided into two streams and supplied to the fan 111 and the fan 21. The refrigerant introduced to the refrigerant inlets 112 and 113 for the DCDC converter 110 is sent to the DCDC converter 110 by the fan 111, and cools the DCDC converter 110. The refrigerant sent to the fan 21 is sent to the upper cell 20 and cools the upper cell 20.

Figure 6:
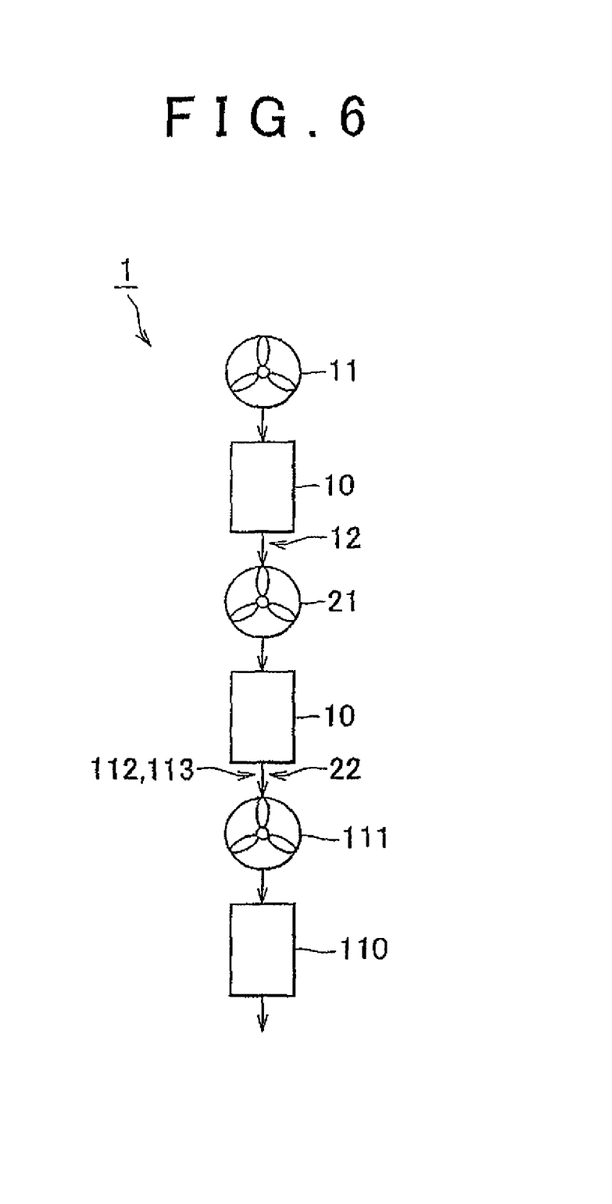
FIG. 6 illustrates the flow of the refrigerant in the cooling system for electric apparatus of a second modification of the first embodiment.

FIG. 6 illustrates the flow of the refrigerant in the cooling system for electric apparatus in accordance with a second modification of the first embodiment. With reference to FIG. 6, in this cooling system 1, the refrigerant is sent to the lower cell 10 by the fan 11 and cools the lower cell. 10. Then, the refrigerant is discharged from the refrigerant outlet 12 for the lower cell 10 and sent to the fan 21 for the upper cell 20. The fan 21 sends the refrigerant to the upper cell 20, and the refrigerant cools the upper cell 20. The refrigerant discharged from the refrigerant outlet 22 for the upper cell 20 is supplied to the refrigerant inlets 112 and 113 for the DCDC converter 110, and then sent to the fan 111. The fan 111 supplies the refrigerant to the DCDC converter 110 and cools the DCDC converter 110.

That is, the cooling system 1 for electric apparatus according to the invention includes the lower cell 10, the upper cell 20 disposed above the lower cell 10, and the DCDC converter 110 as a converter that is disposed above the lower cell 10 and that converts a voltage of the electric power input to or output from the lower cell 10 and the upper cell 20. The lower cell 10, the upper cell 20, and the DCDC converter 110 are cooled by the refrigerant. The refrigerant inlets 112 and 113 for the DCDC converter 110 are disposed in the vicinity of the refrigerant outlets 22 and 12 for one of the upper cell 20 and the lower cell 10.

The exhaust air duct 120 of the DCDC converter 110 is arranged to surround at least one of the upper cell 20 and the lower cell 10.

The chassis 320, on which the upper cell 20 and the lower cell 10 are mounted, is further provided, and the fan 111 as a cooling device that cools the DCDC converter 110 is disposed on the chassis 320. The chassis 320 is provided with the tunnel 321 that extends in the longitudinal direction of the vehicle. The DCDC converter 110 is disposed on the near side to the tunnel 321, and the fan 111 is disposed on the further side from the tunnel 321. The chassis 320 has the pair of suspension towers 310 for rear wheels that support the suspension, and the upper cell 20 and the lower cell 10 are disposed between the suspension towers 310.

The suspension tower 310 has the side surface 311 that is tilted with respect to the vertical direction, and the distance W1 between the side surface 311 and the refrigerant outlet 12 for the lower cell 10 is smaller than the distance W2 between the refrigerant inlets 112, and 113 for the DCDC converter 110 and the side surface 311.

In the cooling system 1 for electric apparatus with the above-mentioned structure, the refrigerant inlets 112 and 113 for the DCDC converter 110 are arranged in the vicinity of the refrigerant outlet 12 for the lower cell 10 and the refrigerant outlet 22 for the upper cell 20, and therefore the DCDC converter 110 can be cooled by the exhaust air from the cell, and also the DCDC converter 110 can be cooled efficiently.

Also, since the DCDC converter 110 and the upper cell 20 are arranged in the space above the lower cell 10, the overall size of the device can be reduced.

Furthermore, since the exhaust air duct 120 for the DCDC converter 110 is arranged to surround at least one of the lower cell 10 and the upper cell 20, the exhaust air from the DCDC converter 110 can be prevented from being taken into the cell, and the lower cell 10 and the upper cell 20 can be protected from impact.

As shown in FIG. 3, since the DCDC converter 110 is disposed on the near side to the tunnel 321 and the fan 111 is disposed on the further side from the tunnel 321, the distance between the DCDC converter 110 and the wiring 333 in the tunnel 321 can be shortened. As a result, an electric loss between the wiring 333 and the DCDC converter 110 can be reduced.

The lower cell 10 and the upper cell 20 are disposed between the pair of suspension towers 310. The area between the suspension towers 310 has a shorter width than the other spaces, so this area tends to be of no use. However, this area can be utilized effectively by disposing therein the lower cell 10 and the upper cell 20.

Also, since the lower cell 10 and the upper cell 20, which are heavy in weight, are mounted between the suspension towers 310, kinematic performance of the vehicle is not impaired compared to the case in which the upper cell 20 and the lower cell 10 are mounted on an overhang of the vehicle.

Also, since a middle portion, between the suspension towers 310 is usually a highly rigid area, the upper cell 20 and the lower cell 10 can be protected from impact.

Figure 7:
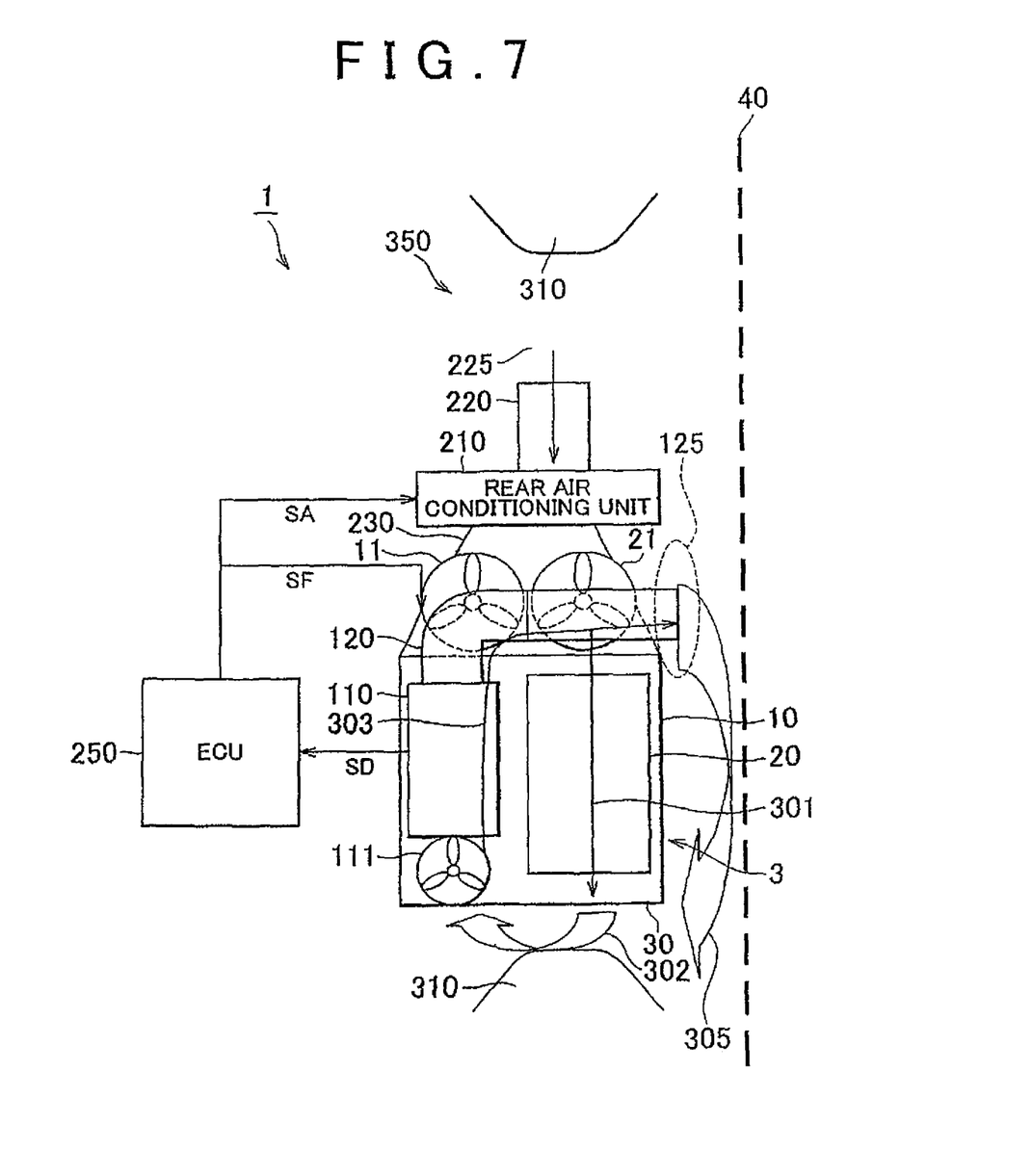
FIG. 7 is a plan view of the cooling system for electric apparatus mounted in the vehicle in accordance with the second embodiment of the present invention.

FIG. 7 is a plan view of the cooling system for electric apparatus mounted in the vehicle in accordance with a second embodiment of the present invention. With reference to FIG. 7, this cooling system 1 incorporates the control of increasing a pressure of exhaust air for cooling the upper cell 20 and the lower cell 10 depending on the heat condition of the DCDC converter 110, so that the high temperature exhaust heat from the DCDC converter 110 does not enter to the inlet of the DCDC converter 110. Increasing the pressure of exhaust air from the cell can reduce a pressure loss of the intake air of the DCDC converter 110, and the fan 111 for the DCDC converter 110 can thus be reduced in size.

Figure 8:
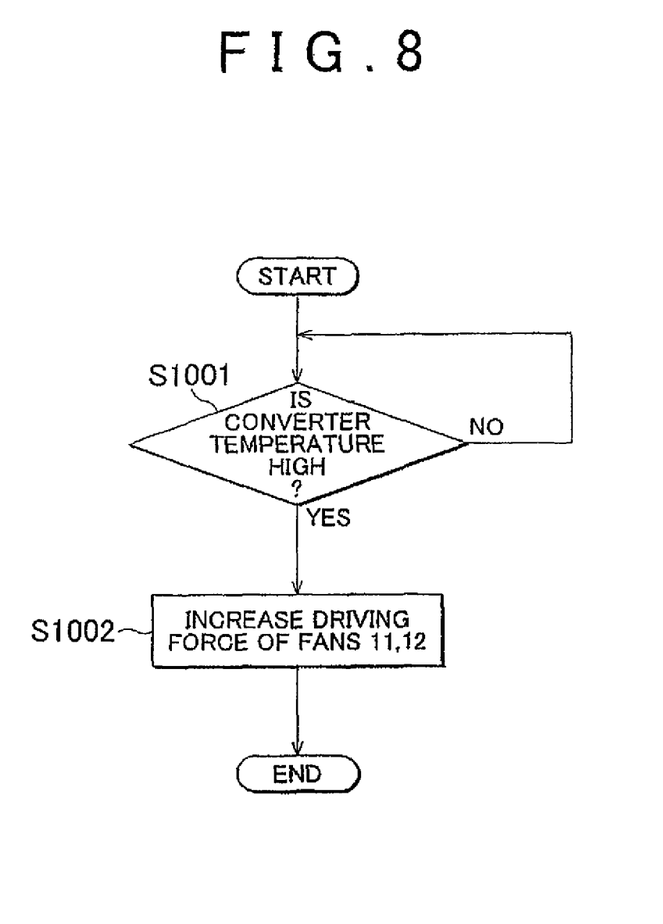
FIG. 8 is a flowchart showing the control of the cooling system for electric apparatus mounted in the vehicle as shown in FIG. 7.

FIG. 8 is a flowchart showing the control of the cooling system for electric apparatus mounted in the vehicle as shown in FIG. 7. With reference to FIG. 8, the signal SD that indicates a temperature of the DCDC converter 110 is sent to the ECU 250. The ECU 250 determines whether the temperature of the DCDC converter 110 is high or not. The signal SD is sent from the DCDC converter 110 to the ECU 250 for this determination (step S1001).

If the temperature of the DCDC converter 110 is determined as not high ("No" in step S1001), the ECU 250 returns the process to the step S1001 to determine the temperature of the DCDC converter 110. If the temperature of the DCDC converter 110 is high ("Yes" in step S1001 in FIG. 8), the ECU 250 sends the signal SF to the fans 11 and 12 to increase the driving force of the fans 11 and 21. Accordingly, the driving force of the fans 11 and 21 is increased and thus the amount of exhaust air from the cell, as indicated by the arrow 302, is increased (step S1002). This exhaust air is suctioned by the fan 111, and the DCDC converter 110 can be cooled securely.

If the driving force of the fans 11 and 21 is not increased, the exhaust air from the exhaust air duct 120 is drawn to the direction indicated by an arrow 305 and may be suctioned by the fan 111. For the purpose of preventing such a phenomenon and reducing the pressure loss resistance of the intake air, the driving force of the cell cooling fans 11 and 21 is increased. Accordingly, the exhaust air is prevented from flowing in the direction of the arrow 305 as shown in FIG. 7.

Figure 9:
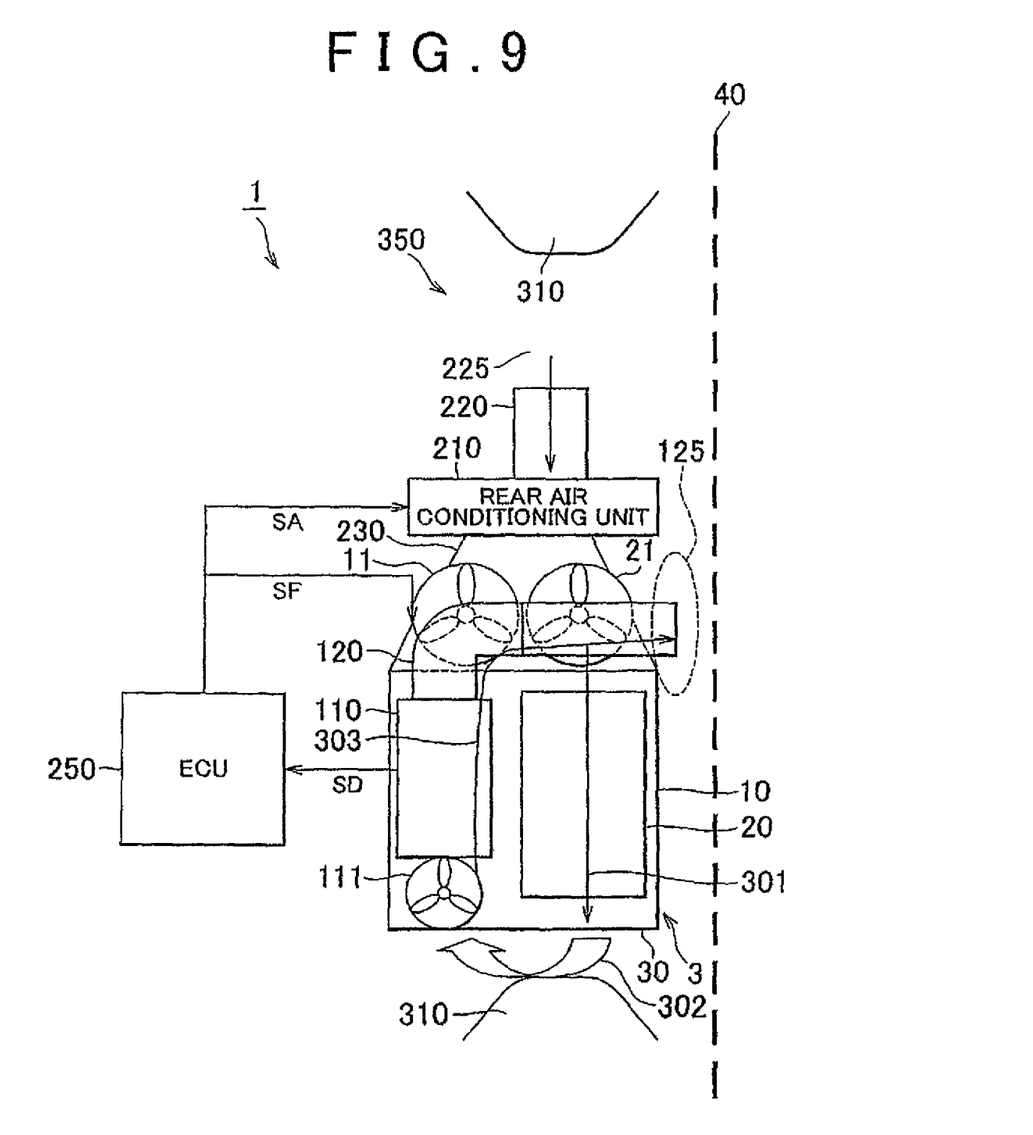
FIG. 9 is a plan view of the cooling system for electric apparatus mounted in the vehicle in accordance with a third embodiment of the present invention.
Figure 10:
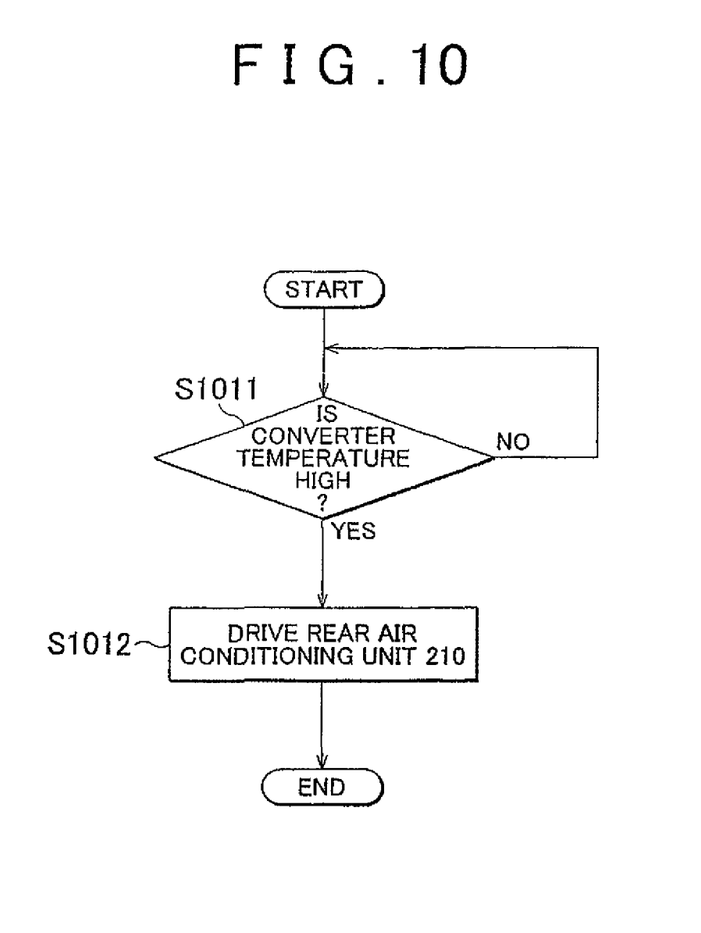
FIG. 10 is a flowchart showing the control of the cooling system for electric apparatus mounted in the vehicle as shown in FIG. 9.

FIG. 9 is a plan view of the cooling system for electric apparatus mounted in the vehicle in accordance with a third embodiment of the present invention. FIG. 10 is a flowchart showing the control of the cooling system for electric apparatus mounted in the vehicle as shown in FIG. 9. With reference to FIG. 9 and FIG. 10, when the internal temperature of the DCDC converter 110 is high, the ECU 250 drives the rear air conditioning unit 210 in order to reduce the intake air temperature, and introduces the cold air (refrigerant) supplied from the rear air conditioning unit 210 to the lower cell 10 and the upper cell 20 by using the fans 11 and 21.

Specifically, in the flowchart shown in FIG. 10, the ECU 250 determines whether the temperature of the DCDC converter is high or not (step S1011). If the temperature of the DCDC converter 110 is not high, the process returns to the step S1011. If the temperature of the DCDC converter 110 is high ("YES" in step S1011), the ECU 250 sends the signal SA to the rear air conditioning unit 210. Upon receipt of the signal, the rear air conditioning unit 210 is driven and sends cold air to the fans 11 and 21 (step S1012). Accordingly, the cold air is introduced to the DCDC converter 110, and the cooling rate of the DCDC converter 110 can thus be improved. As a result, it is possible to reduce the sizes of the cooling fans 11, 21, and 111, the heat sink of the DCDC converter 110, and an internal element of the DCDC converter 110.

Figure 11:
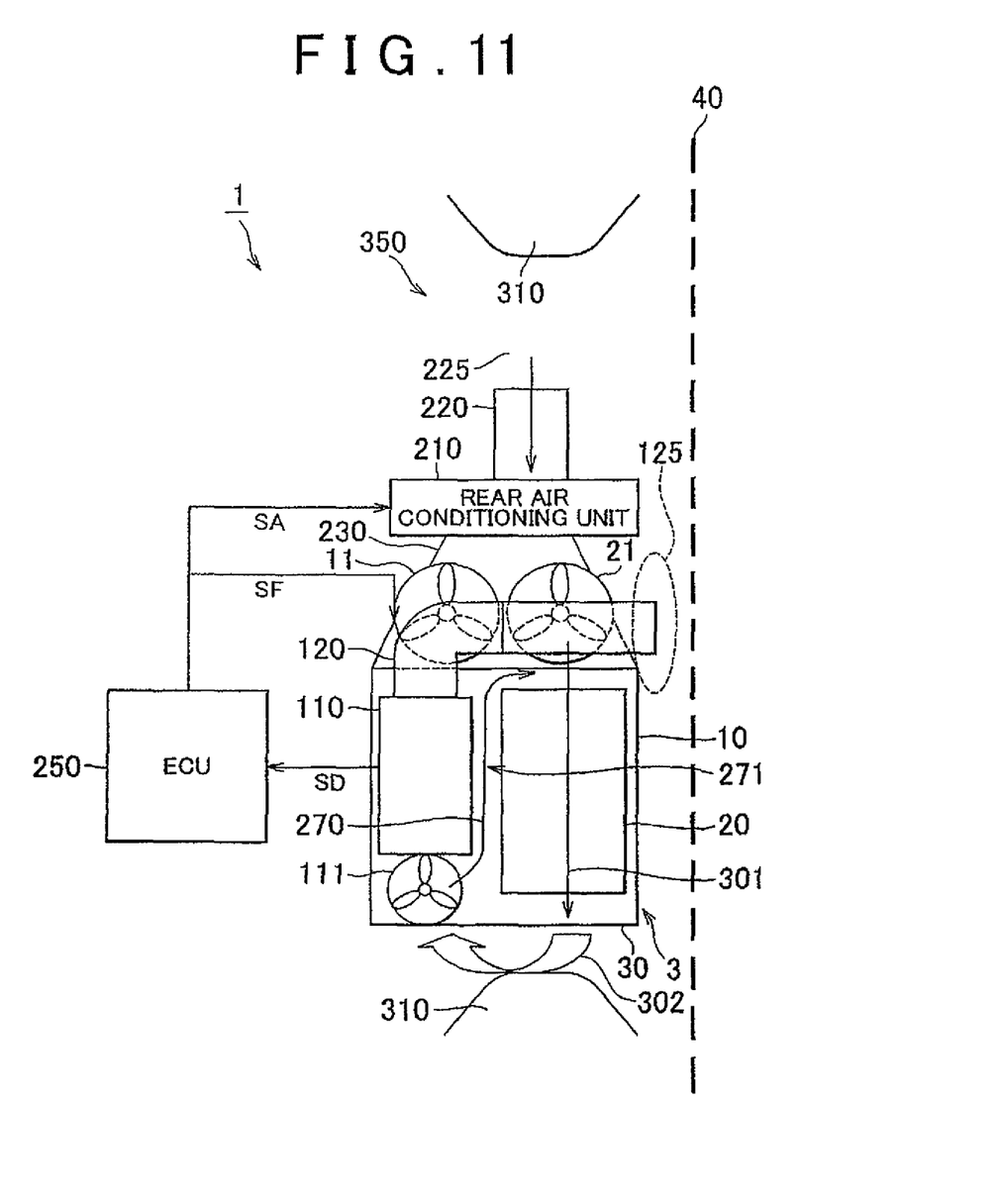
FIG. 11 is a plan view of the cooling system for electric apparatus mounted in the vehicle in accordance with a fourth embodiment of the present invention.

FIG. 11 is a plan view of the cooling system for electric apparatus mounted in the vehicle in accordance with a fourth embodiment of the present invention. With reference to FIG. 11, the cooling system for electric apparatus of this embodiment is provided with a refrigerant passage 271 between the DCDC converter 110 and the upper cell 20, in which the refrigerant is actively drawn, in the direction indicated by an arrow 270, from the fan 111 that cools the DCDC converter 110 to the periphery of the DCDC converter 110. Accordingly, a damage caused by heat to the cell can be prevented, and also substrate parts in the DCDC converter 110 can be prevented from generating heat. That is, the temperature increase of the cell and the thermal variation between upper and lower cells can be reduced by providing a space between the DCDC converter 110 and the upper cell 20 and introducing the cooling air thereinto.

It is understood that the embodiments described herein are exemplary in all respects and not limitative. The scope of the present invention is defined not by the above description but by the appended claims, and the present invention is intended to cover all equivalents and modifications that fall within the scope of the claims.

The invention claimed is:

1. A vehicle comprising a cooling system for electric apparatus mounted in the vehicle, wherein the cooling system comprises:
    a lower cell;
    an upper cell that is disposed above the lower cell; and
    a converter that is disposed above and on the lower cell and that converts a voltage of electric power input to or output from the lower cell and the upper cell, wherein the upper cell and the lower cell are constructed in two layers as a cell pack; and
    a blower that is disposed on the lower cell in order to cool the converter; and
    wherein the lower cell, the upper cell, and the converter are cooled by a refrigerant;
    the vehicle further comprising:
    a chassis on which the cell pack of the lower cell and the upper cell are mounted; and
    a tunnel that is disposed in the chassis to extend in the longitudinal direction of the vehicle and in which a wiring is disposed to be connected to the converter;
    wherein:
    the converter is disposed, on the lower cell, on the near side to the tunnel,
    the blower is disposed, on the lower cell, on the further side from the tunnel, and
    refrigerant inlets of the converter are disposed in the vicinity of a refrigerant outlet of at least one of the upper cell and the lower cell.

2. The vehicle according to claim 1, wherein the cooling system further comprises a refrigerant passage that is disposed between the converter and the upper cell.

3. The vehicle according to claim 1, wherein an exhaust air duct of the converter is arranged around at least one of the lower cell and the upper cell.

4. The vehicle according to claim 1, wherein:
    the chassis has a pair of suspension towers that support a suspension; and
    the upper cell and the lower cell are arranged between the suspension towers.

5. The vehicle according to claim 4, wherein
    the suspension tower has a side surface that is tilted with respect to a vertical direction; and
    the side surface is tilted so that a distance between the side surface and a refrigerant outlet of the lower cell is smaller than a distance between the side surface and the refrigerant inlets of the converter.

6. The vehicle according to claim 1, wherein the cooling system further comprises:
    a temperature sensor that detects a temperature of the converter;
    a first blower that cools the lower cell;
    a second blower that cools the upper cell; and
    a control unit that controls the first blower and the second blower, wherein
    when a temperature detected by the temperature sensor is greater than or equal to a predetermined value, the control unit controls the first blower and the second blower to increase driving force of the first blower and the second blower.

7. The vehicle according to claim 1, wherein the cooling system further comprises:
    a temperature sensor that detects a temperature of the converter;
    a first blower that cools the lower cell;
    a second blower that cools the upper cell;
    an air conditioning unit that reduces a temperature of air and supplies cooled air to the first blower and the second blower; and
    a control unit that controls the air conditioning unit, wherein
    when a temperature detected by the temperature sensor is greater than or equal to a predetermined value, the control unit controls the air conditioning unit to drive the air conditioning unit.

* * * * *